US008616441B2

(12) United States Patent
Mastrangelo et al.

(10) Patent No.: US 8,616,441 B2
(45) Date of Patent: Dec. 31, 2013

(54) SYSTEMS AND METHODS FOR PROCESSING A TRANSACTION ASSOCIATED WITH A CONTACTLESS TRANSACTION CARD

(75) Inventors: Edward L. F. Mastrangelo, Atlanta, GA (US); Steven W Mathison, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 151 days.

(21) Appl. No.: 12/650,856

(22) Filed: Dec. 31, 2009

(65) Prior Publication Data
US 2011/0155800 A1 Jun. 30, 2011

(51) Int. Cl.
*G07F 19/00* (2006.01)
*G06K 5/00* (2006.01)
*G06K 19/06* (2006.01)

(52) U.S. Cl.
USPC ............................ 235/379; 235/380; 235/492

(58) Field of Classification Search
USPC .......... 235/492, 379–382; 705/16, 17, 35, 39, 705/41, 44
See application file for complete search history.

(56) References Cited

U.S. PATENT DOCUMENTS

| | | | |
|---|---|---|---|
| 6,718,314 B2* | 4/2004 | Chaum et al. | 705/64 |
| 8,087,582 B2* | 1/2012 | Hammad et al. | 235/379 |
| 2003/0057272 A1* | 3/2003 | Bidan et al. | 235/380 |
| 2008/0034221 A1* | 2/2008 | Hammad et al. | 713/190 |
| 2008/0120236 A1* | 5/2008 | Faith et al. | 705/44 |
| 2008/0197201 A1* | 8/2008 | Manessis et al. | 235/492 |
| 2008/0257956 A1* | 10/2008 | Grannan et al. | 235/380 |
| 2009/0055893 A1* | 2/2009 | Manessis et al. | 726/2 |
| 2009/0313131 A1* | 12/2009 | Giordano | 705/17 |
| 2010/0051685 A1* | 3/2010 | Royyuru et al. | 235/379 |
| 2010/0325039 A1* | 12/2010 | Radu et al. | 705/39 |

* cited by examiner

*Primary Examiner* — Thien M Le
*Assistant Examiner* — April Taylor
(74) *Attorney, Agent, or Firm* — Sutherland Asbill & Brennan LLP

(57) ABSTRACT

Embodiments of the invention relate to systems and methods for processing a transaction associated with a contactless transaction card. In one embodiment, a method for processing a transaction associated with a contactless transaction card can be provided. The method can include polling for at least one transaction application program via a contactless transaction card reader. Further, the method can include receiving account information from the contactless transaction card via the contactless transaction card reader. In addition, the method can include activating a corresponding transaction application program based at least in part on the received account information. Moreover, the method can include advancing a transaction counter associated with the contactless transaction card and a transaction counter associated with the corresponding transaction application program.

17 Claims, 4 Drawing Sheets

SYSTEMS AND METHODS FOR PROCESSING A TRANSACTION ASSOCIATED WITH A CONTACTLESS TRANSACTION CARD

TECHNICAL FIELD

The invention relates generally to transaction cards, and more particularly to systems and methods for processing a transaction associated with a contactless transaction card.

BACKGROUND OF THE INVENTION

Contactless transaction initiation is often performed with a "smart" card. Such a card typically includes radio-frequency identification ("RFID") components for contactless communication with a point-of-sale device, a chip, and a magnetic stripe that permits the card also to be used in a conventional magnetic-stripe card reader. The information communicated via the RFID components is generally similar or identical to the information recorded on the magnetic stripe. Payment systems that use contactless cards are generally restricted to providing a mechanism for a payment channel. In some systems, payment requests are routed through a conventional debit or credit authorization network, while in other systems, payment requests are processed offline by the card, which includes a "stored value" account balance. These offline cards are sometimes referred to in the art as "electronic wallets," "e-wallets," "electronic purses," or "e-purses."

Other types of stored-value cards, also referred to or otherwise sold as gift cards, are typically associated with a centralized and remote stored-value account. Such cards may be contactless, and in some instances, may be relatively simple plastic cards with magnetic stripes. In any instance, the remote account is charged when the card is used through an exchange of information over a network, and can often be replenished by the cardholder or a third party. When the card is used, an account number comprised by the card permits access to the account. These cards also typically provided only a single payment channel, with all payment requests being directed to the remote account that stores the account balance.

In many instances, various contactless card issuers have a proprietary application program on their respective contactless cards that is equipped with a transaction counter. This counter is advanced each time the contactless card, is presented at a contactless reader, and the reader performs a successful read of the contactless application program. As a fraud control measure, issuers also have a transaction counter on their respective host transaction servers. Each time a contactless card transaction occurs, the transaction counter on the host transaction server is advanced for that particular contactless card payment account. For each transaction, the transaction counter on the contactless card s matched against the transaction counter on the host transaction server. If there is a discrepancy beyond a predefined tolerance, the transaction may be declined.

For certain card transactions, such as magnetic stripe cards, consumers have a choice of choosing the payment application they use to complete a transaction. In these transactions, the same data for both PIN-based debit and signature based debit/credit transactions is used. However, for contactless card transactions, reading both applications may cause both application counters to advance, but only one application's payment account information will be sent to the host; thus, discrepancies between the transaction counters may result and payment transactions may be declined.

SUMMARY OF THE INVENTION

Embodiments of the invention can provide some or all of the above needs. Certain embodiments of the invention can provide systems and methods for processing a transaction associated with a contactless transaction card. Certain embodiments can provide systems and methods of authenticating a transaction. In one embodiment, a method for processing a transaction associated with a contactless transaction card can be provided. The method can include polling for at least one transaction application program via a contactless transaction card reader. Further, the method can include receiving account information from the contactless transaction card via the contactless transaction card reader. In addition, the method can include activating a corresponding transaction application program based at least in part on the received account information. Moreover, the method can include advancing a transaction counter associated with the contactless transaction card and a transaction counter associated with the corresponding transaction application program.

In another embodiment, a system for processing a transaction associated with a contactless transaction card can be provided. The system can include a processor comprising a computer-readable medium with a set of instructions operable to poll for at least one transaction application program via a contactless transaction card reader. The computer-readable medium can include a set of instructions operable to receive account information from the contactless transaction card via the contactless transaction card reader. Further, the computer-readable medium can include a set of instructions operable to activate a corresponding transaction application program based at least in part on the received account information. In addition, the computer-readable medium can include a set of instructions operable to advance a transaction counter associated with the contactless transaction card and a transaction counter associated with the corresponding transaction application program.

In another embodiment, a method for authenticating a transaction can be provided, wherein a contactless transaction card reader has been polling for a particular transaction application program. The method can include receiving account information from a contactless transaction card via the contactless transaction card reader. Further, the method can include advancing a transaction counter associated with the particular transaction application program. Furthermore, the method can include advancing a transaction counter associated with the particular transaction application program. In addition, the method can include comparing data from the transaction counter associated with the transaction application program with data from a transaction counter associated with the contactless transaction card, prior to authorizing a transaction associated with the particular transaction program, wherein the transaction is authorized if the data from the transaction counters are at or within a predefined count difference.

In another embodiment, a system for authenticating a transaction can be provided, wherein at least one payment option for a consumer has been selected and a contactless transaction card reader has been activated. The system can include a processor comprising a computer-readable medium with a set of instructions operable to receive account information from a contactless transaction card via the contactless transaction card reader. Further, the computer-readable medium can include a set of instructions operable to advance a transaction counter associated with the particular transaction application program. In addition, the computer-readable medium can include a set of instructions operable to compare data from the transaction counter associated with the transaction application program with data from a transaction counter associated with the contactless transaction card, prior to authorizing a transaction associated with the particular transaction program, wherein the transaction is authorized if the data from the transaction counters are at or within a predefined count difference.

Other systems and processes according to various embodiments of the invention will become apparent with respect to the remainder of this document.

BRIEF DESCRIPTION OF DRAWINGS

Figure 1:
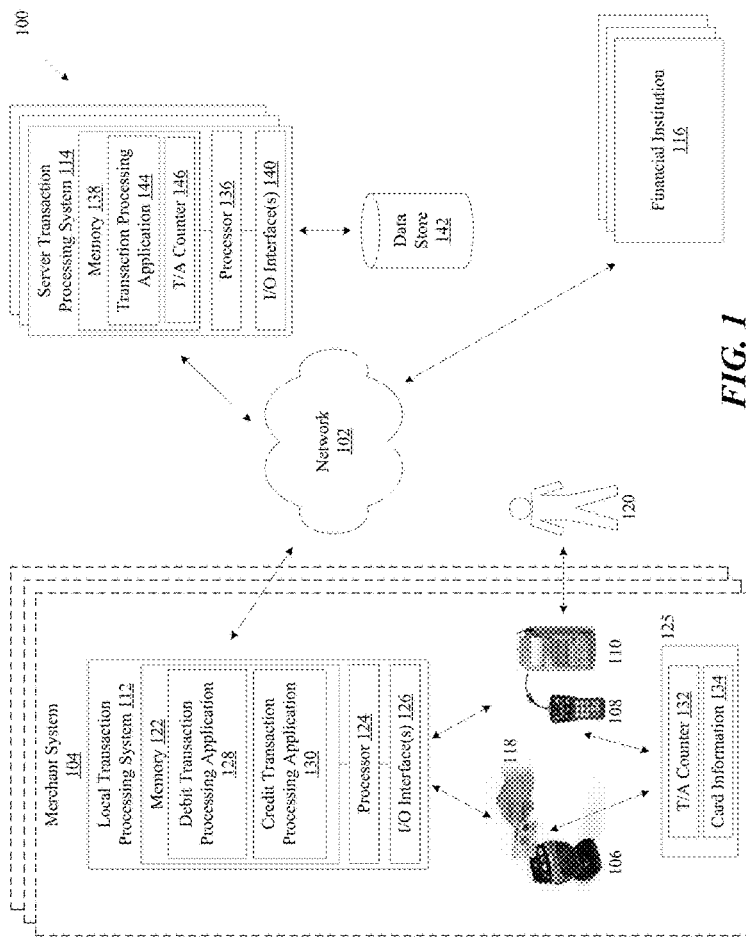
Figure 2:
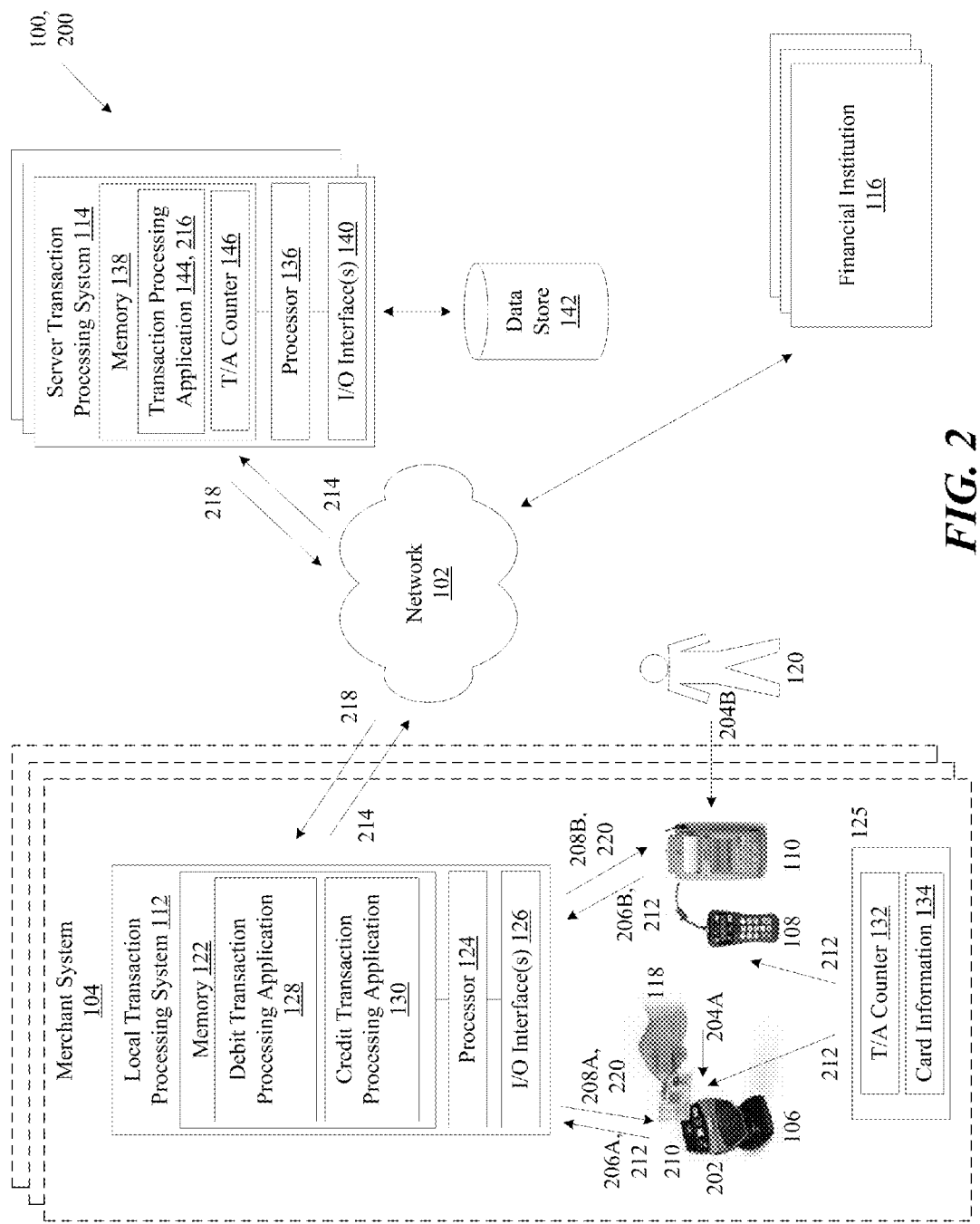
Figure 3:
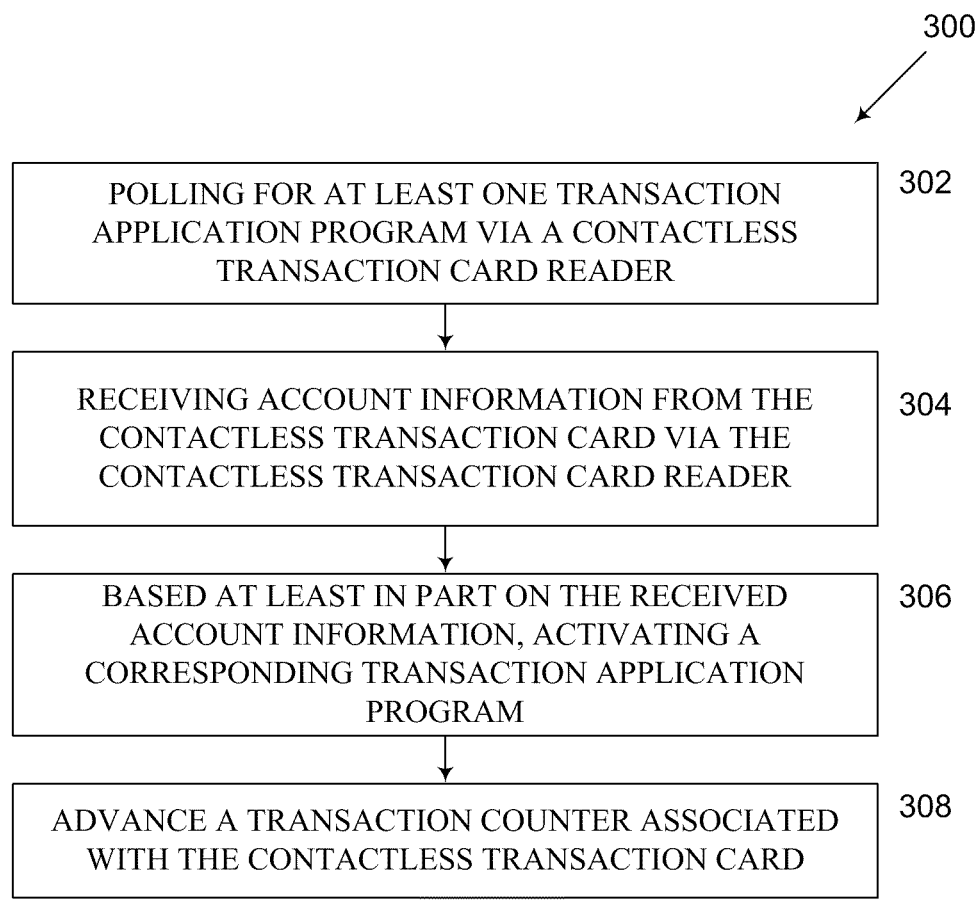
Figure 4:
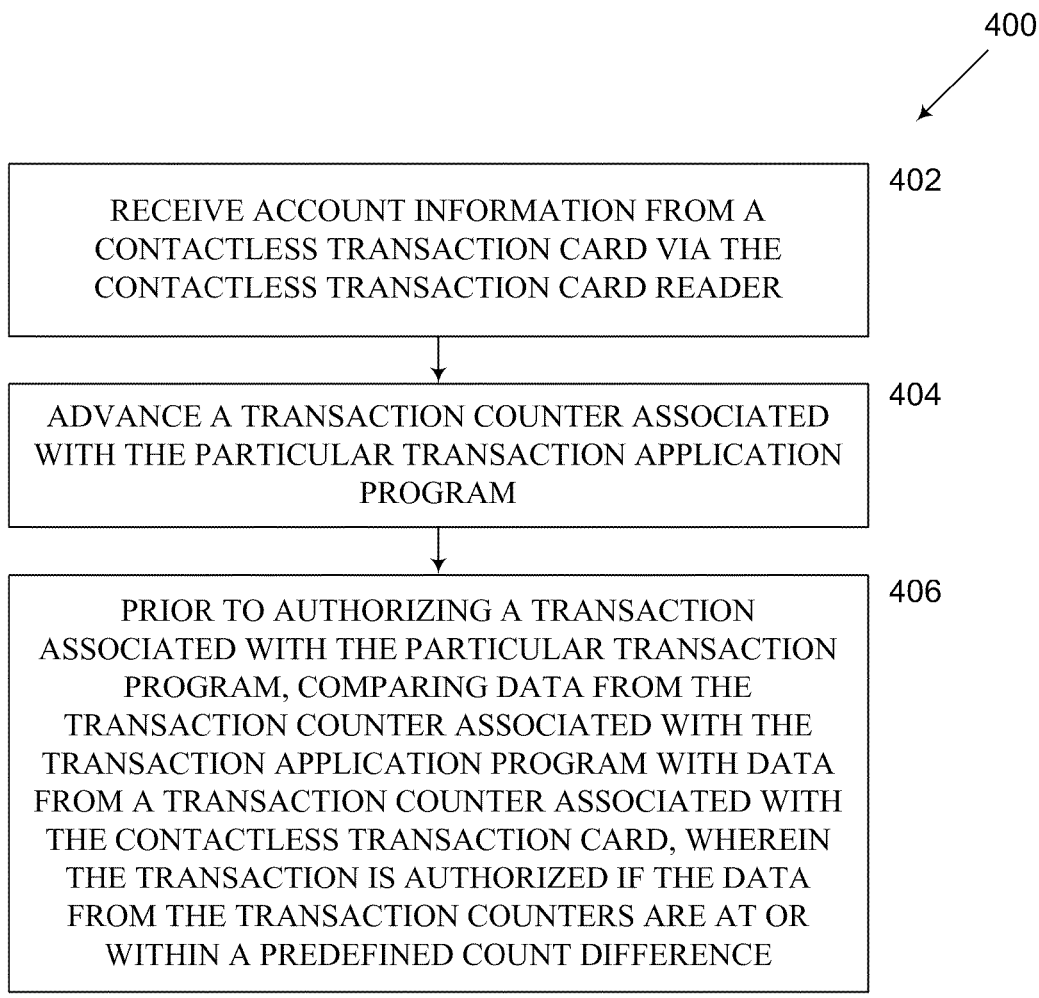

Having thus described embodiments of the invention in general terms, reference will now be made to the accompanying drawings, which are not drawn to scale, and wherein:

FIG. 1 illustrates an example functional block diagram of an example system, according to one embodiment of the invention;

FIG. 2 illustrates an example data flow of an example system and method, according to one embodiment of the invention FIG. 3 illustrates an example flowchart of an example method, according to one embodiment of the invention; and FIG. 4 illustrates an example flowchart of an example method, according to one embodiment of the invention

DETAILED DESCRIPTION OF EMBODIMENTS OF THE INVENTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention. Like numbers refer to like elements throughout.

As used herein, the terms "contactless transaction card", "transaction card", and "contactless card" can refer to a gift card, a stored value card, a credit card, a debit card, a loyalty card, a coupon card, a tangible medium, or an electronic or virtual-type instrument provided by a merchant, a retailer, a merchant bank, a financial institution, or any other type of entity. For example, a contactless transaction card can be a card with a predetermined monetary amount associated with the card. In another example, a contactless transaction card can be an electronic certificate with a predetermined monetary amount or benefit associated with the certificate. The term "card" should not be limited to a rectangular or polygon-shaped objects, but can include any type of tangible object or payment instrument. In another example, a contactless transaction card can be a storage device such as a memory chip embedded in or associated with a sticker, telecommunications device, or other device or apparatus used by a consumer user to facilitate a payment transaction. One example of a contactless transaction card is a smart card that can be tapped against or otherwise manipulated adjacent to, without contact, a contactless transaction card reader or similar device, which reads information from the contactless transaction card.

As used herein, the terms "transaction application processing program", "transaction application program", "transaction processing application", "card transaction program", "credit transaction application program", "credit transaction processing application", "debit transaction application program", and "debit transaction processing application" can refer to computer-executable sets of instructions for processing an electronic transaction associated with a transaction card or account, such as a contactless transaction card or an account associated with a user.

Certain embodiments of the invention generally provide for systems and methods for processing a transaction associated with a contactless transaction card. Other embodiments of systems and methods can provide authentication of a transaction, wherein a contactless transaction card reader has been polling for a particular transaction application program.

Certain embodiments of systems and methods described herein can provide a competitive feature when marketing such cards to consumers and merchants. Because certain embodiments can be implemented at a point of sale (POS), consumers can be offered payment option flexibility as well as transaction authentication services related to these systems and methods, thus providing unique benefits to consumers as well as merchants. Since certain embodiments can implement POS logic and instructions, relatively easier and more efficient transactions can result which provide users with a greater number of choices of payment options using a transaction card, in particular, dual or multiple application cards, while reducing the number of times the user must tap such cards, and thus, advance the associated transaction counters.

FIG. 1 illustrates an example environment and system in accordance with an embodiment of the invention. In this example, the environment can be a client-server configuration, and the system can be a transaction card processing system 100. The system 100 is shown with a communications network 102, such as the Internet and/or a telephone network, in communication with one or more merchant systems 104, which can include any number of associated card transaction client devices equipped with a contactless transaction card reader or card reader functionality, such as a contactless card transaction device 106, PIN pad 108, transaction terminal 110, point of sale (POS) terminal, personal computer, or other telecommunications devices. The card transaction client devices 106, 108, 110, which are shown by example only, can typically be administered by respective merchants or associated merchant systems 104. The system 100 can also include at least one local transaction processing system 112, such as may be operated by or on behalf of one or more merchant system, for example, 104. The system 100 can also include at least one server transaction processing system 114, such as may be operated by or on behalf of one or more third party payment processors or account program managers, and at least one financial institution system 116, such as an issuing bank or merchant bank. It will be appreciated that while the disclosure may in certain instances describe only a single merchant system 104, local transaction processing system 112, server transaction processing system 114, and financial institution system 116, there may be multiple merchant systems, local transaction processing systems, server transaction processing systems, and/or financial institution systems, without departing from example embodiments of the invention.

The communications network 102 shown in FIG. 1 may include any telecommunication and/or data network, whether public, private, or a combination thereof, including a local area network, a wide area network, an intranet, an internet, the Internet, intermediate hand-held data transfer devices, a publicly switched telephone network ("PSTN"), a cellular network, and/or any combination thereof and may be wired and/or wireless. The network 102 may also allow for real-time, off-line, and/or batch transactions to be transmitted between or among the merchant systems 104, local transaction processing system 112, server transaction processing system 114, and/or financial institution system 116. Due to network connectivity, various methodologies as described herein may be practiced in the context of distributed computing environments. It will also be appreciated that the network 102 may include a plurality of networks, each with devices such as gateways and routers for providing connectivity between or among networks 102. Instead of, or in addition to, a network 102, dedicated communication links may be used to connect the various devices in accordance with an example embodiment invention. For example, the local transaction processing system 112 and server transaction processing system 114 may form the basis of network 102 that interconnects any number of the merchant systems 104 and/or financial institution system 116.

The one or more merchant systems 104 can be one or more systems at any merchant, such as a retailer or a services provider, for processing consumer transactions. The merchant systems 104 may include at least one of the card transaction client devices shown as 110, 112, 114. In other embodiments, the merchant systems 104 may include a POS transaction terminal for capturing transaction information, for interfacing with a cash register, for displaying information to a terminal operator and/or a consumer, and for processing transactions with an account processor, such as a server transaction processing system 114. Example consumer transactions that may be processed by a merchant system 104 may include, but are not limited to, purchasing, payment, account inquiry, account activation, loading, and reloading transactions.

A merchant system 104 can include one or more computer or processor-based devices capable of communicating with the communications network 102 via a signal, such as a wireless frequency signal or a direct wired communication signal. In at least one embodiment, more than one merchant system 104 can be in communication with communications network 102 to transmit and receive communications between other system components. The merchant systems 104 can include or otherwise be associated with a processor and a computer-readable medium, such as RAM, ROM, and/or a removable storage device. Merchant systems 104 may operate on any operating system capable of supporting an application program including, but not limited to, Microsoft Windows®, Apple OSX™, and Linux. In one embodiment, the merchant system 104 may include computer executable program instructions stored in memory for processing consumer transactions within the merchant system 104 and with other back-end account processors, such as the server transaction processing system 114 and/or any other financial institutions 116, or third-party service providers. The merchant system 104 can also include one or more I/O interface(s) to facilitate communication with one or more other components of the system 100, such as, with one or more client devices 106, 108, 110, one or more local transaction processing systems 112, one or more server transaction processing systems 114, and/or one or more financial institution systems 116, for example, over the network 102. According to one example embodiment, the merchant system 104 can communicate with the server transaction processing system 114 via the one or more networks 102, which may include a proprietary private network, a banking network, such as an ACH network, or a combination thereof, for processing financial and account transactions between the entities of the system 100. POS terminals associated with the merchant system 104 may also include any number of other external or internal devices such as a card reader, contactless transaction card reader, a magnetic card reader, a RFID reader, a mouse, a CD-ROM, DVD, a keypad, a keyboard, a display, or other input or output devices. In addition to or instead of a conventional POS terminal, a merchant system 104 may include electronic cash registers, electronic kiosks, mobile computers, handheld portable computers, digital assistants, personal digital assistants, cellular phones, mobile phones, smart phones, pagers, digital tablets, desktop computers, laptop computers, Internet appliances, and other processor-based devices, and/or may be implemented via a web portal or other electronic commerce service.

In one embodiment, a suitable merchant system 104 and associated software can include, but is not limited to, Aloha® EDC Server, Datacap Systems Datatran™, DataVantage® Tradewind®, EMN8® OrderM8™, Exadigm Mate Plus, Hypercom® T4100, IBM® Websphere®, Infogenesis Revelation, Ingenico® Ingepay™, Micros®, Oracle® iPayment, Radiant® Systems Epsilon, Southern Datacomm Protobase®, and VeriFone® Omni™ based systems.

Generally, each merchant system 104 can include a local transaction processing system 120 with a respective memory 122 and processor 124. The memory 122 of the local transaction processing system 120 and/or those associated with the client devices 106, 108, 110 can store data and information for subsequent retrieval. In this manner, the system 100 can store various received or collected information in memory or a database associated with one or more card transaction client devices 106, 108, 110, local transaction processing systems 112, server transaction processing systems 114, financial institution systems 116 and/or merchant systems 104. The memories and data stores or databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the data stores or databases shown can be integrated or distributed into any number of databases or data stores.

Suitable processors for card transaction client devices 106, 108, 110, local transaction processing system 112, server transaction processing system 114, financial institution system 116 and/or merchant system 104 may comprise a microprocessor, an ASIC, and state machine. Example processors can be those provided by Intel Corporation (Santa Clara, Calif.), AMD Corporation (Sunnyvale, Calif.), and Motorola Corporation (Schaumburg, Ill.). Such processors comprise, or may be in communication with media, for example computer-readable media, which stores instructions that, when executed by the processor, cause the processor to perform the elements described herein. Embodiments of computer-readable media include, but are not limited to, an electronic, optical, magnetic, or other storage or transmission device capable of providing a processor, such as the processor 124 of the local transaction processor system 112, or any other processors, for example those used by the client devices 106, 108, 110, server transaction processing system 114, financial institution system 116 and/or merchant system 104 with computer-readable instructions. Other examples of suitable media include, but are not limited to, a floppy disk, CD-ROM, DVD, magnetic disk, memory chip, ROM, RAM, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

In the system illustrated in FIG. 1, at least one consumer 118 may operate a card transaction client device such as a contactless card transaction device, for example 106, by inputting or selecting a particular payment option from a user interface, and further manipulating a transaction card or contactless card, such as 125, adjacent to the contactless card transaction device 106. By way of example, certain card transaction client devices such as a VivoTech™ VIVO PAY 4500 can be operated by a consumer user, such as 118, by tapping or otherwise manipulating his or her transaction card, but a particular payment option may also be communicated to a merchant user, such as 120, to initiate or otherwise select a particular payment option via a transaction terminal associated with the card transaction client device. In certain instances, a merchant user 120 may operate a card transaction client device, such as a transaction terminal 110 with an associated PIN pad 108 for data entry by a consumer, such as 118. In these instances, the user may input or select a particular payment option from a user interface, and further enter data from a transaction card, such as 125, with respect to the PIN pad 108, or otherwise present the card to a merchant user 120 who may manipulate or otherwise enter data from the transaction card, such as 125, with respect to the PIN pad 108 or transaction terminal 110. By way of further example, a card transaction client device such as a First Data™ FD-30 PIN pad can be operated by a consumer user, such as 118, to input a selection of a particular payment option. Likewise, the consumer user 118 may communicate to a merchant user, such as 120, to initiate or otherwise select a particular payment option via a transaction terminal associated with the card transaction client device such as a First Data™ FD-30 PIN pad. In any instance, at least one payment option as well as transaction account or transaction card information 134 from the transaction card 125 can be input and transmitted from any of the card transaction client devices 106, 108, 110 to the local transaction processing system 112 for processing and/or storage.

Typically, the transaction card or contactless card, for example 125, can be a contactless transaction card. One example of a contactless transaction card is a smart card that can be tapped against or otherwise manipulated adjacent to, without contact, a contactless transaction card reader or similar device, which reads information from the contactless transaction card. A smart card can include an embedded chip or memory for storing information such as account or card information as well as a transaction counter. In another example, a contactless transaction card can be a storage device such as a memory chip embedded in or associated with a sticker, telecommunications device, or other device or apparatus used by a consumer user to facilitate a payment transaction.

Typically, payment options can include credit transaction and debit transactions, but in certain embodiments, can also include a stored value card payment, a loyalty card payment, a gift card payment, and a coupon payment. Typically, transaction account or transaction card information 134 can include an account identification information and account holder information. Other transaction account or transaction card information 134 can include, but is not limited to, a name, an address, a third party or financial institution name, and a third party or financial institution account number, personal identification information, bank account information, debit account information, credit account information, stored value account information, loyalty account information, gift card account information, or coupon account information.

The card transaction client devices may be any processor-based device operable to communicate over a network. Example card transaction client devices include contactless card transaction devices, PIN pads, transaction terminals, point of sale (POS) terminals, personal computers, mobile computers, handheld portable computers, digital assistants, personal digital assistants, cellular phones, mobile phones, smart phones, pagers, digital tablets, desktop computers, laptop computers, Internet appliance, or any other processor-based device. A respective communication or input/output interface associated with each card transaction client device can facilitate communications between the card transaction client device and the network 102. Each card transaction client device can include a processor and a computer-readable medium, such as a random access memory ("RAM"), read only memory ("ROM"), and/or a removable storage device, coupled to the processor. The processor can execute computer-executable program instructions stored in memory. Card transaction client devices may operate on any operating system capable of supporting a browser or browser-enabled application including, but not limited to, Microsoft Windows®, Apple OSX™, and Linux. The card transaction client devices may include, for example, personal computers executing a browser application program such as Microsoft Corporation's Internet Explorer™, Netscape Communication Corporation's Netscape Navigator™, and Apple's Safari™, and Mozilla Firefox™. The card transaction client devices may also include one or more input/output ("I/O") interface(s) to facilitate communication with one or more other components of the system 100, such as, with one or more local transaction processing systems 112, one or more server transaction processing systems 114, one or more financial institution systems 116, and/or one or more merchant systems 104.

As mentioned, the system 100 can include one or more local transaction processing systems 112 in communication with the client devices 106, 108, 110, the server transaction processing systems 114, the financial institution systems 116, and the merchant systems 104 over the one or more networks 102. The local transaction processing system 112 is used to facilitate processing stored value account transactions, debit transactions, and credit transactions, such as may be performed by an account processor and/or account program manager. The processor and/or program manager associated with the local transaction processing system 112 may facilitate performing account and card services for or on behalf of other entities, such as for card issuing financial institutions (which may otherwise be referred to herein as "issuers," "card issuers," or "account issuers"). In other embodiments, the local transaction processing system 112 may be a distributed system, and at least some of the functionality described herein with reference to the transaction processing system may be performed in a distributed manner by one or more of the other entities and/or systems described herein.

The local transaction processing system 112 may include at least one processor 124, a memory 122, and one or more I/O interface(s) 126. The memory 122 may be any computer-readable medium, such as RAM, ROM, and/or a removable storage device, coupled to the processor 124. The memory 122 may include an operating system ("OS"), such as, but not limited to, Microsoft Windows®, Apple OSX™, or Linux, and a database management system ("DBMS") to facilitate management of data files and data stored in the memory 122 and/or stored in a data store, for example. The processor 124 is operable to execute computer-executable program instructions stored in memory 122, which may include a debit transaction processing application 128 and a credit transaction processing application 130. An example of a suitable debit transaction processing application is a STAR™ PIN debit network transaction processing application. Other embodiments can include other transaction processing applications, such as coupon payment, stored value card, gift card, or loyalty card transaction processing applications. The debit transaction processing application 128 can include instructions or other functionality to manipulate a transaction counter 132 associated with the consumer's transaction card, for example, 125. In certain instances, data associated with the transaction counter 132 can be transmitted separately or with transaction account or transaction card information 134 to the local transaction processing system 112 or merchant system 104 for processing and/or storage in memory 122 or the processor 124.

The debit transaction processing application 128 can include instructions for processing typical debit financial transactions, such as activations, funding, account access, payments, account migration or conversions, settlement and reconciling transactions, account and account data management, account holder data management, merchant, financial institution, and other customer data management, and any other transactions as may typically be performed by a debit card or other payment instrument processor as well as incrementing or otherwise manipulating the transaction counter associated with the consumer's transaction card, such as transaction counter 132. More specifically, according to one embodiment, the debit transaction processing application 128 can include instructions for polling for at least one transaction application program via a contactless transaction card reader; receiving account information from the contactless transaction card via the contactless transaction card reader; activating a corresponding transaction application program based at least in part on the received account information; and advancing a transaction counter associated with the contactless transaction card and a transaction counter associated with the corresponding transaction application program. In certain embodiments, the debit transaction processing program can include instructions for managing transaction rules for controlling transactions and access to account information stored in memory 122, including funding rules and access rules.

The credit transaction processing application 130 can include instructions for processing typical credit financial transactions, such as activations, funding, account access, payments, account migration or conversions, settlement and reconciling transactions, account and account data management, account holder data management, merchant, financial institution, and other customer data management, and any other transactions as may typically be performed by a credit card or other payment instrument processor as well as incrementing or otherwise manipulating the transaction counter associated with a consumer's transaction card, such as transaction counter 132. More specifically, according to one embodiment, the credit transaction processing application 130 can include instructions for polling for at least one transaction application program via a contactless transaction card reader; receiving account information from the contactless transaction card via the contactless transaction card reader; activating a corresponding transaction application program based at least in part on the received account information; and advancing a transaction counter associated with the contactless transaction card and a transaction counter associated with the corresponding transaction application program. In certain embodiments, the credit transaction processing program can include instructions for managing transaction rules for controlling transactions and access to account information stored in memory 122, including funding rules and access rules.

The transaction counter 132 can track or otherwise count the number of respective transactions facilitated by the debit transaction processing application 128 and/or credit transaction processing application 130. In some embodiments, more than transaction counter can be implemented to track or otherwise count the respective number of different types of transactions. That is, a first transaction counter can count the number of credit transactions, a second transaction counter can count the number of debit transactions, and other transaction counters can count the number of other types of transactions. For example, each time a debit transaction is initiated and the debit transaction processing application 128 is utilized to facilitate the debit transaction, the transaction counter 132 can be incremented by a count of 1, and the resulting count can be stored. After each subsequent debit transaction, the transaction counter 132 can be incremented or otherwise increased accordingly. Likewise, each time a credit transaction is initiated and the credit transaction processing application 130 is utilized to facilitate the credit transaction, the transaction counter 132 can be incremented by a count of 1, and the resulting count can be stored. After each subsequent credit transaction, the transaction counter 132 can be incremented or otherwise increased accordingly.

The debit transaction processing application 128 and credit transaction processing application 130 may additionally operate respectively in conjunction with one or more of the I/O interfaces 126 to facilitate communication with one or more other components of the system 100, such as, with one or more transaction client devices such as 106, 108, 110, one or more server transaction processing systems 114, one or more financial institution systems 116, and/or one or more merchant systems 104. It will be appreciated that the local transaction processing system 112 may be implemented on a general purpose computer or may be a specialized machine in which a computer is customized to perform at least the functions of the debit transaction processing application 128 and credit transaction processing application 130, according to an example embodiment of the invention.

As mentioned, the system 100 can include one or more server transaction processing systems 114 in communication with the client devices 106, 108, 110, the financial institution systems 116, and the merchant systems 104 over the one or more networks 102. The server transaction processing system 114 is used to facilitate processing any number of stored value account, debit, and credit transactions, such as may be performed by an account processor and/or account program manager. The processor and/or program manager associated with the server transaction processing system 114 may perform account and card services for or on behalf of other entities, such as for card issuing financial institutions (which may otherwise be referred to herein as "issuers," "card issuers," or "account issuers"). In other embodiments, the server transaction processing system 114 may be a distributed system, and at least some of the functionality described herein with reference to the transaction processing system may be performed in a distributed manner by one or more of the other entities and/or systems described herein.

The server transaction processing system 114 may include one or more transaction processing systems, which may include server devices, mainframe computers, networked computers, a processor-based device, or any other suitable processor-based devices for electronically processing financial transactions received over a network and communicated between individuals, merchants, financial institutions, employers, and other entities. The server transaction processing system 114 can include at least one processor 136, a memory 138, and one or more I/O interface(s) 140. The memory 138 may be any computer-readable medium, such as RAM, ROM, and/or a removable storage device, coupled to the processor 136. The memory 138 may include an operating system ("OS"), such as, but not limited to, Microsoft Windows®, Apple OSX™, or Linux, and a database management system ("DBMS") to facilitate management of data files and data stored in the memory 138 and/or stored in a data store 142, for example. The processor 136 is operable to execute computer-executable program instructions stored in memory 138, which may include a transaction processing application 144. Other embodiments can include other transaction processing applications, such as coupon or loyalty card processing applications. The transaction processing application 144 can include an associated transaction counter 146, which can be implemented or otherwise stored in memory 138 or by the processor 136. The transaction processing application 144 can include instructions for processing typical financial transactions, such as activations, funding, account access, payments, account migration or conversions, settlement and reconciling transactions, account and account data management, account holder data management, merchant, financial institution, and other customer data management, and any other transactions as may typically be performed by a stored value card, debit, credit, or other payment instrument processor as well as incrementing or otherwise manipulating an associated transaction counter, such as 146. More specifically, according to one embodiment, the transaction processing application 144 can include instructions for polling for at least one transaction application program via a contactless transaction card reader; receiving account information from the contactless transaction card via the contactless transaction card reader; activating a corresponding transaction application program based at least in part on the received account information; and advancing a transaction counter associated with the contactless transaction card and a transaction counter associated with the corresponding transaction application program. In another embodiment, the transaction processing application 144 can include instructions for receiving account information from a contactless transaction card via the contactless transaction card reader; advancing a transaction counter associated with the particular card transaction application program; and comparing data from the transaction counter associated with the card transaction program with data from a transaction counter associated with the contactless transaction card, prior to authorizing a transaction associated with the particular card transaction program, wherein the transaction is authorized if the data from the transaction counters are at or within a predefined count difference. In certain embodiments, the transaction processing program can include instructions for managing transaction rules for controlling transactions and access to account information stored in memory 122, including funding rules and access rules. The transaction processing application 144 may additionally operate in conjunction with one or more of the I/O interfaces 140 to facilitate communication with one or more other components of the system 100, such as, with one or more transaction client devices such as 110, 112, 114, one or more financial institution systems 108, and/or one or more merchant systems 104.

Similar to the transaction counter 132 described above, the transaction counter 146 associated with the transaction processing program 144 can track or otherwise count the number of respective transactions facilitated by the server transaction processing system 114 with the debit transaction processing application 128 and/or credit transaction processing application 130 for a particular transaction card, such as 125. Similar to above, in some embodiments, more than transaction counter can be implemented to track or otherwise count the respective number of different types of transactions facilitated by the server transaction processing system 114. That is, a first transaction counter can count the number of credit transactions facilitated by the server transaction processing system 114, a second transaction counter can count the number of debit transactions facilitated by the server transaction processing system 114, and other transaction counters can count the number of other types of transactions facilitated by the server transaction processing system 114. For example, each time a debit transaction is initiated and the server transaction processing system 114 facilitates a debit transaction with the debit transaction processing application 128 for a particular transaction card 125, the transaction counter 146 associated with the transaction processing application 144 can be incremented by a count of 1, and the resulting count can be stored. After each subsequent debit transaction, the transaction counter 146 can be incremented or otherwise increased accordingly. Likewise, each time a credit transaction is initiated and the server transaction processing system 114 facilitates a credit transaction with the credit transaction processing application 130 for a particular transaction card, such as 125, the transaction counter 146 associated with the transaction processing application 144 can be incremented by a count of 1, and the resulting count can be stored. After each subsequent credit transaction, the transaction counter 146 can be incremented or otherwise increased accordingly. In certain instances, as explained above, multiple transaction counters can be used to separately track different types of transactions, such as a transaction counter for debit transactions and another transaction counter for credit transactions, wherein a sum total of the various transaction counters (debit and credit-related, or other) for a particular transaction card, such as 125, can be used for subsequent comparisons.

In certain embodiments, counts from the transaction counter 146 can be compared, by a processor such as 136, with another transaction counter such as 132, and based on the comparison, a particular transaction with a transaction card, such as 125, can be authorized or declined. For example, if the counts from the transaction counter 146 and the transaction counter 132 associated with the transaction card of interest, such as 125, match or otherwise are within a predefined threshold or count difference, an associated debit transaction can be authorized by the processor 136. For example, a predefined threshold or count difference can be preset at 5.

It will be appreciated that the server transaction processing system 106 may be implemented on a general purpose computer or may be a specialized machine in which a computer is customized to perform at least the functions of the transaction processing application 144, according to an example embodiment of the invention.

The one or more financial institution systems 116 can be any financial institution, such as an issuing bank for stored value accounts, a merchant bank, an employer bank, and/or a processor bank. A financial institution system 116 can include one or more computer or processor-based devices capable of communicating with the communications network 102 via a signal, such as a wireless frequency signal or a direct wired communication signal. In at least one embodiment, more than one financial institution system 116 can be in communication with communications network 102 to transmit and receive communications between other system components. Similar to the server transaction processing system 114, the financial institution system 108 can include or otherwise be associated with a processor and a computer-readable medium, such as RAM, ROM, and/or a removable storage device. In one embodiment, the financial institution system 116 includes computer executable program instructions stored in memory for maintaining financial accounts, such as consumer stored value accounts, debit accounts, or credit accounts processed by one or more account processors associated with the server transaction processing system 114, merchant bank accounts, and for settling transactions associated therewith. The financial institution system 116 can also include one or more I/O interface(s) to facilitate communication with one or more other components of the system 100, such as, with one or more client devices 106, 108, 110, one or more local transaction processing systems 112, one or more server transaction processing systems 114, and/or one or more merchant systems 104, for example, over the network 102. According to one example embodiment, the financial institution system 116 can communicate with the server transaction processing system 114 via the one or more networks 102, which may include a banking network, such as an ACH network, for processing financial and account transactions between the entities of the system 100.

Other system embodiments in accordance with the invention can include fewer or greater numbers of components and may incorporate some or all of the functionality described with respect to the system components shown in FIG. 1.

FIG. 2 illustrates an example data flow 200 between the components and entities shown associated with the example transaction card processing system 100 of FIG. 1 for processing a contactless transaction card in accordance with an example embodiment of the invention. As shown in FIG. 2, a card transaction client device, such as 106, can actively poll 202 for a particular type of transaction card or contactless transaction card, such as 125. For example, the card transaction client device can be a contactless card transaction device 106, and a contactless transaction card reader associated with the contactless card transaction device 106 can actively poll or otherwise seek a consumer's transaction card or contactless card, such as 125. By way of example, the card transaction client device, such as 106, can be pre-programmed to actively poll for a debit transaction processing application, such as a STAR™ PIN debit network transaction processing application. In other embodiments, other transaction processing applications can be polled for or otherwise sought by a card transaction client device similar to 106, 108, or 110. In yet other embodiments, the card transaction client device, such as 106, can be pre-programmed to poll for a predefined order of one or more transaction processing applications.

In one embodiment, a consumer user such as 118 can enter 204A or designate a payment option, such as a transaction type or other information associated with a transaction card or a contactless card, for example 125, at a card transaction client device, such as 106. The consumer user 118 can, for example, input a payment option such as transaction type identifier or other information in a contactless card transaction device 106 using an input/output device, such as a keyboard, associated with the contactless card transaction device 106. The contactless card transaction device 106 can transmit 206A to the local transaction processing system 112 a signal corresponding to the payment option such as a transaction type identifier or other information, and the local transaction processing system 112 can process the signal to activate 206 suitable functionality associated with the contactless card transaction device 106 and initiate 208A at least one transaction processing application to facilitate polling for a particular type of transaction card or a contactless card, such as 125, via the contactless card transaction device 106. For example, if the consumer user 118 inputs a debit transaction identifier to the contactless card transaction device 106 via a keyboard associated with the contactless card transaction device 106, the contactless card transaction device 106 can transmit the identifier to the local transaction processing system 112, which activates reading functionality associated with the contactless card transaction device 106 and initiates the debit transaction processing application 128 to begin polling for the consumer's transaction card or contactless card, such as 125, via the contactless card transaction device 106.

In any instance, the user 118 can manipulate 210 the transaction card or contactless card, such as 125, with respect to the contactless card transaction device 106. For example, the user 118 may tap his or her transaction card or contactless card, such as 125, against the contactless card transaction device 106. The pre-programmed transaction processing application, or selected transaction processing application in the above example, receives 212 or otherwise reads the card information such as 134 suitable for processing the debit transaction as well as data associated with the transaction counter, such as 132, from the consumer's transaction card or contactless card, such as 125. In certain embodiments, only the card information needed for processing the debit transaction, or other selected transaction such as credit, is read from the card 125. The pre-programmed transaction processing application, or selected transaction processing application in the above example, routes 214 the card information 134 and data associated with the transaction counter, such as 132, from the merchant system 104 to the server transaction processing system 114 for processing the debit transaction. Furthermore, the transaction counter, such as 132, associated with the card 125 and type of transaction can be advanced, incremented, or otherwise manipulated to account for the desired transaction and the type of desired transaction. In this example, a transaction counter can be maintained for credit transactions, and a separate transaction counter may be maintained for debit transactions. In other embodiments, any number of transaction counters can be maintained, advanced, incremented, manipulated, and stored with respect to the card 125.

In another embodiment, a merchant user such as 120 can enter 202B or designate a payment option, such as a transaction type or other information associated with a transaction card or a contactless card, for example 125, at a transaction terminal, such as 110. The merchant user 120 can, for example, input a payment option such as transaction type identifier or other information in a transaction terminal such as 110 using an input/output device, such as a keyboard, associated with the transaction terminal 110. The transaction terminal, such as 110, can transmit 206B to the local transaction processing system 112 a signal corresponding to the payment option such as a transaction type identifier or other information, and the local transaction processing system 112 can process the signal to activate 208B suitable functionality associated with the contactless card transaction device 106 and initiate 208B at least one transaction processing application to facilitate polling for a particular type of transaction card or a contactless card, such as 125, via the transaction terminal. For example, if the merchant user 120 inputs a debit transaction identifier to the transaction terminal 110 via a keyboard associated with the transaction terminal 110, the transaction terminal 110 can transmit the identifier to the local transaction processing system 112, which activates reading functionality associated with the PIN pad 108 and/or transaction terminal 110, and initiates the debit transaction processing application 128 to begin polling for the consumer's transaction card or contactless card, such as 125, via the PIN pad 108 and/or the transaction terminal 110.

In any instance, the server transaction processing system 114 receives the card information 134 and data associated with the transaction counter, such as 132, and compares 216 counts from the transaction counter stored at the server transaction processing system 114, that is, transaction counter 146, with the data associated with the transaction counter, such as 132. Based on the comparison, the transaction can be authorized or declined by the transaction processing application 144. For example, if the comparison matches or is within a predefined threshold or count difference, the transaction may be authorized. Upon authorization or decline of the transaction, the server transaction processing system 114 can transmit 218 an indication to the merchant system 104 of the transaction decision. For example, if the transaction is declined by the server transaction processing system 114, an indication can be transmitted 218 by the transaction processing application 144 to the merchant system 104, wherein the selected transaction processing application, in the above example, the debit transaction processing application 128, can further transmit 220 a corresponding indication to the consumer user 118 via the contactless card transaction device 106 or the transaction terminal 110 and/or PIN pad 108 that the transaction has been declined and further transaction processing can be halted.

On the other hand, if the transaction is authorized by the server transaction processing system 114, an indication can be transmitted 218 by the transaction processing application 144 to the merchant system 104, wherein the selected transaction processing application, in the above example, the debit transaction processing application 128, can further transmit an indication to the consumer user 118 via the contactless card transaction device 106, or the merchant user 120 via the transaction terminal 110 and/or PIN pad 108, that the transaction has been authorized. In this instance, the debit transaction processing application 128 can take further action, if needed, to complete the credit transaction.

In certain embodiments, for instance a PIN debit transaction, the debit transaction processing application 128 may prompt the consumer user 118 to enter a PIN associated with the transaction card 125. If the user 118 cancels the transaction, for example by entering "cancel" on a PIN pad, such as 108, the user 118 can tap the card 125 on the card transaction reader to initiate the debit transaction again. In such instances, the card transaction client device, such as the contactless card transaction device 106, can poll for certain pre-programmed transaction application programs or may require an input from a consumer user 118 and/or merchant user 120 prior to polling for a certain or selected transaction application program. For example, in one embodiment, after an initial transaction is cancelled, the card transaction client device, such as the contactless card transaction device 106, can continue to poll for the same pre-programmed transaction application program as before. In another embodiment, after an initial transaction is cancelled, the card transaction client device, such as the contactless card transaction device 106, can be programmed to poll for a predefined order of one or more transaction application programs, such as a VISA™ transaction application program, then a MasterCard™ transaction application program, then a gift card transaction application program, then a loyalty card transaction application program, etc. By way of further example, in another embodiment, a command or prompt from the card transaction client device, such as the contactless card transaction device 106, can request an input from the consumer user 118 and/or merchant user 120 to select a payment option to begin polling for a corresponding transaction application program. In any instance, the transaction counter such as 132 can be advanced with each tap of the transaction card 125, and the corresponding transaction counter at the server transaction processing system 114, such as 146, can be advanced upon completion of a transaction.

Similar interactions between a consumer user 118 or merchant user 120, a card transaction client device or other client devices similar to 106, 108, 110, merchant systems 104 and local transaction processing systems 112, and server transaction processing systems 114 can be facilitated by other embodiments of the invention. For example, if a credit transaction or other transaction is desired by either the consumer user 118 or the merchant user 120, the credit transaction processing application 130 or other transaction processing application can process the user inputs 204A, 204B. In yet another example, a corresponding transaction processing application for stored value card payments, loyalty card payments, gift card payments, or coupon payments can be implemented by the merchant system 104 and/or the local transaction processing system 112 to process a desired type of transaction. In another example, if a consumer user 118 utilizes a point of sale (POS) terminal, personal computer, or other telecommunications device to select a payment option, a suitable transaction processing application or set of instructions can process the corresponding user inputs. In any instance, a transaction counter similar to 132 associated with the transaction card or contactless card, such as 125, can be incremented, or otherwise manipulated accordingly, and when necessary, compared to a transaction counter, similar to 146, associated with the server transaction processing system to authorize a particular transaction.

One skilled in the art may recognize the applicability of embodiments of the invention to other environments, contexts, and applications. One will appreciate that components of the system 100 and data flow 200 shown in and described with respect to FIGS. 1 and 2 are provided by way of example only. Numerous other operating environments, system architectures, and device configurations are possible. Accordingly, embodiments of the invention should not be construed as being limited to any particular operating environment, system architecture, or device configuration.

Embodiments of a system, such as 100, and data flow, such as 200, can facilitate processing a contactless transaction card. Improvements in contactless transaction card accounting and management, as well as new sources of contactless transaction card revenue, can be achieved by way of implementation of various embodiments of the system 100, data flow 200, and methods described herein. Example methods and processes which can be implemented with the example system 100 and data flow 200, as well as other system and data flow embodiments, are described by reference to FIGS. 3 and 4.

FIG. 3 illustrates an example method of processing a transaction associated with a contactless transaction card, according to one embodiment of the invention. The method 300 begins at block 302, in which at least one transaction application program is polled for via a contactless transaction card reader. In the embodiment shown in FIG. 3, at least one card transaction client device or other client devices similar to 106, 108, 110, shown by way of example in FIG. 1, can poll for or otherwise seek at least one transaction application program. For example, a card reader interface associated with a card transaction client device such as 106 can poll for or seek at least one transaction application program. In other embodiments, a predefined or particular transaction application program can be polled for by the contactless transaction card reader.

Block 302 is followed by block 304, in which account information is received from the contactless transaction card via the contactless transaction card reader. In the embodiment shown in FIG. 3, account information from the contactless transaction card, such as card information 134 from card 125 in FIG. 1, can be read from the card 125 via the contactless transaction card reader, such as 106. For example, the contactless transaction card reader, such as 106, can read the consumer's transaction card, such as 125, when the card is tapped or otherwise manipulated adjacent to the contactless transaction card reader 106. The contactless transaction card reader 106 can obtain or otherwise read account information from the card 125, and transmit the information to the local transaction processing system, such as 112 in FIG. 1, for processing.

Block 304 is followed by block 306, in which a corresponding transaction application program is activated, based at least in part on the received account information. In the embodiment shown in FIG. 3, a local transaction processing system 112, merchant system 104, and/or processor 124 as in FIG. 1 can receive the card information 134 from the card 125, and based at least in part on the card information 134, a corresponding transaction application program, such as 128 or 130 in FIG. 1, can be activated. For example, if credit card information for facilitating a credit transaction is received, the credit transaction processing application 130 can be activated. Likewise, if debit card information for facilitating a debit transaction is received, the debit transaction processing application 128 can be activated.

In one aspect of one embodiment, the corresponding transaction application program can include, but is not limited to, a credit transaction application program, a debit transaction application program, a stored value card transaction application program, a loyalty transaction application program, a gift card payment transaction application program, or a coupon payment transaction application program.

In one aspect of one embodiment, account information can include, but is not limited to, personal identification information, bank account information, debit account information, credit account information, stored value account information, loyalty account information, gift card account information, or coupon account information.

Block 306 is followed by block 308, in which a transaction counter associated with the contactless transaction card and a transaction counter associated with the corresponding transaction application program are advanced. In the embodiment shown in FIG. 3, the local transaction processing system 112, transaction processing application, and/or processor 124 can advance the transaction counter, such as 132 in FIG. 1, associated with the consumer's transaction card, such as 125. For example, for a credit transaction, the credit transaction processing application 130 can transmit data to the consumer's card 125 via the contactless transaction card reader 106, and advance or otherwise manipulate the transaction counter 132 associated with the consumer's transaction card 125. Likewise, the credit transaction processing application 130 can transmit an indication to the server transaction processing system 114, transaction processing application, such as 144, and/or processor such as 136 via network 102, and advance or otherwise manipulate the transaction counter, such as 146, stored at the server transaction processing system 114.

In one aspect of one embodiment, advancing the transaction counter associated with the contactless transaction card and the transaction counter associated with the corresponding transaction application program can include, but is not limited to, advancing the transaction counters by the same increment.

After block 308, the method 300 ends.

In one aspect of one embodiment, the method 300 can include transmitting at least a portion of the account information for processing a transaction associated with the selected payment option.

In another aspect of one embodiment, the method 300 can include comparing the transaction counters; and if the transaction counters are at or within a predefined count difference, authorizing the transaction.

In one aspect of one embodiment, the method 300 can include receiving an input associated with a selection of at least one payment option, wherein the input can include at least one of: receiving a consumer selection via a user interface device, receiving the input via a transaction terminal, or receiving the input via a user interface device.

In one aspect of one embodiment, the at least one payment option can include, but is not limited to, a credit payment, a debit payment, a stored value card payment, a loyalty card payment, a gift card payment, or a coupon payment.

In one aspect of one embodiment, the method 300 can include declining the transaction if the transaction counters are not at or within a predefined count difference.

FIG. 4 illustrates an example method of authenticating a transaction, wherein at a contactless transaction card reader has been polling for a particular transaction program, according to one embodiment of the invention.

This example method 400 begins at block 402, in which account information from a contactless transaction card is received via the contactless transaction card reader. In the embodiment shown in FIG. 4, the contactless transaction card reader, such as 106 in FIG. 1, can read the consumer's transaction card, such as 125, when the card is tapped or otherwise manipulated adjacent to the contactless transaction card reader 106. The contactless transaction card reader 106 can obtain or otherwise read account information from the card 125, and transmit the information to the local transaction processing system 112 and/or suitable transaction processing application for processing. For example, for a debit transaction, the contactless transaction card reader 106 in FIG. 1 can obtain account information and data associated with the transaction counter 132 from the card 125, and transmit the account information and the data associated with the transaction counter 132 to the debit transaction processing application 128 for processing the credit transaction.

Block 402 is followed by block 404, in which a transaction counter associated with the particular transaction application program is advanced. In the embodiment shown in FIG. 4, the local transaction processing system 112, transaction processing application, and/or processor 124 can advance the transaction counter 132 associated with the consumer's transaction card, such as 125. For example, for a debit transaction, the debit transaction processing application 128 can transmit data to the consumer's card 125 via the contactless transaction card reader 106, and advance or otherwise manipulate the transaction counter 132 associated with the consumer's transaction card 125. Likewise, the debit transaction processing application 128 can transmit an indication to the server transaction processing system 114, transaction processing application 144, and/or processor 136 via network 102, and advance or otherwise manipulate the transaction counter 146 stored at the server transaction processing system 114.

Block 404 is followed by block 406, in which data from the transaction counter associated with the card transaction application program is compared with data from a transaction counter associated with the contactless transaction card, prior to authorizing a transaction associated with the particular transaction application program, wherein the transaction is authorized if the data from the transaction counters are at or within a predefined count difference. In the embodiment shown in FIG. 4, the server transaction processing system 114, transaction processing application 144 and/or processor 136 can compare data from the transaction counter, such as 132, associated with the consumer's transaction card, such as 125, with data from the transaction counter, such as 146, associated with the server transaction processing system 114. For example, if the counts between the transaction counter 132 and the transaction counter 146 match or are otherwise within a predefined threshold or count difference, the transaction can be authenticated and approved. If the counts do not match or are not within a predefined threshold or count difference, the transaction may be declined.

In one aspect of one embodiment, the method 400 can include transmitting a notification if the data from the transaction counters are not at or within a predefined count difference After block 406, the method 400 ends.

Embodiments of the invention are described above with reference to block diagrams and flowchart illustrations of systems, methods, apparatuses and computer program products. It will be understood that some or all of the blocks of the block diagrams and flowchart illustrations, and combinations of blocks in the block diagrams and flowchart illustrations, respectively, can be implemented by computer program instructions. These computer program instructions may be loaded onto a general purpose computer, special purpose computer such as a switch, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational elements or steps to be performed on the computer or other programmable apparatus to produce a computer-implemented process such that the instructions that execute on the computer or other programmable apparatus provide elements or steps for implementing the functions specified in the flowchart block or blocks.

Accordingly, blocks of the block diagrams and flowchart illustrations may support combinations of means for performing the specified functions, combinations of elements for performing the specified functions, and program instruction means for performing the specified functions. It will also be understood that some or all of the blocks of the block diagrams and flowchart illustrations, and combinations of blocks in the block diagrams and flowchart illustrations, can be implemented by special purpose hardware-based computer systems that perform the specified functions, elements, or combinations of special purpose hardware and computer instructions.

Additionally, it is to be recognized that, while the invention has been described above in terms of one or more embodiments, it is not limited thereto. Various features and aspects of the above described invention may be used individually or jointly. Although the invention has been described in the context of its implementation in a particular environment and for particular purposes, its usefulness is not limited thereto and the invention can be beneficially utilized in any number of environments and implementations. Furthermore, while the methods have been described as occurring in a specific sequence, it is appreciated that the order of performing the methods is not limited to that illustrated and described herein, and that not every element described and illustrated need be performed. Accordingly, the claims set forth below should be construed in view of the full breadth of the embodiments as disclosed herein.

The invention claimed is:

1. A method for processing a transaction associated with a contactless transaction card, comprising:
    polling for at least one transaction application program via a contactless transaction card reader;
    receiving account information from the contactless transaction card via the contactless transaction card reader;
    receiving at least one payment option selection via a transaction processing system in communication with the contactless transaction card reader;
    based at least in part on the received account information and payment option selection, activating a corresponding transaction application program, wherein the corresponding transaction application program includes a credit transaction application program, a debit transaction application program, a stored value card transaction application program, a loyalty transaction application program, a gift card payment transaction application program, or a coupon payment transaction application program; and
    advancing a corresponding transaction counter of a plurality of transaction counters associated with the contactless transaction card and a transaction counter associated with the corresponding transaction application program by the same increment.

2. The method of claim 1, further comprising:
    transmitting at least a portion of the account information for processing a payment option associated with the corresponding transaction application program.

3. The method of claim 2, further comprising:
    comparing the transaction counters; and
    if the transaction counters are at or within a predefined count difference, authorizing the transaction.

4. The method of claim 3, wherein:
    if the transaction counters are not at or within a predefined count difference, declining the transaction.

5. The method of claim 1, further comprising:
    wherein receiving the at least one payment option selection comprises at least one of: receiving a consumer selection via a user interface device, or receiving consumer selection via a transaction terminal.

6. The method of claim 5, wherein the at least one payment option comprises:
    a credit payment, a debit payment, a stored value card payment, a loyalty card payment, a gift card payment, or a coupon payment.

7. The method of claim 1, wherein the account information comprises: personal identification information, bank account information, debit account information, credit account information, stored value account information, loyalty account information, gift card account information, or coupon account information.

8. A system for processing a transaction associated with a contactless transaction card, comprising:

a processor comprising a computer-readable medium with a set of instructions operable to:
poll for at least one transaction application program via a contactless transaction card reader;
receive account information from the contactless transaction card via the contactless transaction card reader;
receiving at least one payment option selection via a transaction processing system in communication with the contactless transaction card reader;
based at least in part on the received account information and payment option selection, activate a corresponding transaction application program, wherein the corresponding transaction application program includes a credit transaction application program, a debit transaction application program, a stored value card transaction application program, a loyalty transaction application program, a gift card payment transaction application program, or a coupon payment transaction application program; and
advance a corresponding transaction counter of a plurality of transaction counters associated with the contactless transaction card and a transaction counter associated with the corresponding transaction application program by the same increment.

9. The system of claim 8, wherein the computer-readable medium comprises a set of instructions further operable to:
transmit at least a portion of the account information for processing a payment option associated with the corresponding transaction application program.

10. The system of claim 9, wherein the computer-readable medium comprises a set of instructions further operable to:
compare the transaction counters; and
if the transaction counters are at or within a predefined count difference, authorize the transaction.

11. The system of claim 10, wherein the computer-readable medium comprises a set of instructions further operable to:
if the transaction counters are not at or within a predefined count difference, decline the transaction.

12. The system of claim 8, wherein the payment option selection input comprises at least one of: receiving a consumer selection via a user interface device, or receiving consumer selection via a transaction terminal.

13. The system of claim 8, wherein the at least one payment option comprises:
a credit payment, a debit payment, a stored value card payment, a loyalty card payment, a gift card payment, or a coupon payment.

14. The system of claim 8, wherein the account information comprises: personal identification information, bank account information, debit account information, credit account information, stored value account information, loyalty account information, gift card account information, or coupon account information.

15. A method for authenticating a transaction, wherein a contactless transaction card reader has been polling for a particular transaction application program, the method comprising:

receiving account information from a contactless transaction card via the contactless transaction card reader;
receiving at least one payment option selection via a transaction processing system in communication with the contactless transaction card reader;
from a plurality of transaction counters, advancing a transaction counter of a plurality of transaction counters stored on the contactless transaction card and associated with the particular transaction application program associated with the at least one payment option selection by the same increment; and
prior to authorizing a transaction associated with the particular transaction application program, comparing data from the transaction counter associated with the transaction application program with data from a transaction counter associated with the contactless transaction card and corresponding to the at least one payment option selection, wherein the transaction is authorized if the data from the transaction counters are at or within a predefined count difference.

16. The method of claim 15, further comprising:
transmitting a notification if the data from the transaction counters are not at or within a predefined count difference.

17. A method for processing a transaction associated with a contactless transaction device comprising:
receiving account information from the contactless transaction device via a contactless transaction reader;
receiving at least one payment option selection via a transaction processing system in communication with a contactless transaction reader, wherein the at least one payment option selection comprises a credit payment, a debit payment, a stored value payment, a loyalty payment, a gift card payment, or a coupon payment;
from one of a plurality of transaction counters stored on the contactless transaction device, receiving a first transaction counter value corresponding to the at least one payment option selection via the contactless transaction reader;
based at least in part on the received account information and at least one payment option selection, activating a corresponding transaction application program and retrieving, from the one of the plurality of transaction counters stored on the contactless transaction device, a second transaction counter value corresponding to the transaction application program;
comparing the first transaction counter value and the second transaction counter value based at least in part on the comparison,
determining whether to authorize a transaction associated with the account information; and
manipulating the first and second transaction counter values by the same increment.

* * * * *